(12) United States Patent
Wood

(10) Patent No.: US 6,920,967 B2
(45) Date of Patent: Jul. 26, 2005

(54) CONTROLLER FOR REDUCING EXCESSIVE AMPLITUDE OF OSCILLATION OF FREE PISTON

(75) Inventor: James Gary Wood, Albany, OH (US)

(73) Assignee: Sunpower, Inc., Athens, OH (US)

( * ) Notice: Subject to any disclaimer, the term of this patent is extended or adjusted under 35 U.S.C. 154(b) by 25 days.

(21) Appl. No.: 10/406,554

(22) Filed: Apr. 3, 2003

(65) Prior Publication Data

US 2004/0195742 A1 Oct. 7, 2004

(51) Int. Cl.$^7$ .................................................. F16F 7/10
(52) U.S. Cl. ...................... 188/380; 188/379; 267/136; 267/140.14; 60/520
(58) Field of Search ................................ 188/267, 379, 188/380; 267/136, 140.14, 175, 177; 60/520, 522, 517

(56) References Cited

U.S. PATENT DOCUMENTS

| | | | | |
|---|---|---|---|---|
| 4,400,941 A | * | 8/1983 | Rauch | 60/520 |
| 4,694,650 A | * | 9/1987 | Vincent | 60/520 |
| 5,385,021 A | * | 1/1995 | Beale | 60/520 |
| 5,502,968 A | * | 4/1996 | Beale | 60/520 |
| 5,647,217 A | * | 7/1997 | Penswick et al. | 60/520 |
| 5,895,033 A | | 4/1999 | Ross et al. | |
| 6,050,092 A | * | 4/2000 | Genstler et al. | 60/520 |
| 6,094,912 A | * | 8/2000 | Williford | 60/520 |
| 6,247,310 B1 | * | 6/2001 | Norris et al. | 60/521 |

* cited by examiner

Primary Examiner—Matthew C. Graham
Assistant Examiner—Mariano Sy
(74) Attorney, Agent, or Firm—Jason H. Foster; Kremblas, Foster, Phillips & Pollick

(57) ABSTRACT

An apparatus for detecting and reducing excessive amplitude of oscillation of a free piston slidably mounted in a housing. The housing has a vibration absorber, including a mass mounted through a spring to the housing. The mass reciprocates relative to the housing along a path in a phase relationship to the piston. A sensor is mounted near the mass for detecting the amplitude of oscillation of the mass. A controller is connected to the sensor for reducing the amplitude of oscillation of the piston when the amplitude of oscillation of the mass reaches a predetermined maximum.

14 Claims, 2 Drawing Sheets

CONTROLLER FOR REDUCING EXCESSIVE AMPLITUDE OF OSCILLATION OF FREE PISTON

BACKGROUND OF THE INVENTION

1. Field of the Invention

This invention relates generally to free piston machines, and more particularly to an apparatus for reducing excessive amplitude of oscillation of a piston in a free piston machine.

2. Description of the Related Art

Many different kinds of machines operate by reciprocating massive objects along a path, causing vibration. For example, a conventional internal combustion engine has one or more cylindrical pistons slidably mounted within a sealed cylindrical cavity. As a flammable gas is injected into one end of the cavity and ignited, the resulting combustion reaction forces the piston along a path of reciprocation toward the opposite end.

The piston of the conventional internal combustion engine is linked to a crank shaft, and upon reaching the limit of its travel, the piston stops and begins to move in the opposite direction. This continues in a cycle. The cyclical stopping and starting of the piston in a conventional internal combustion engine causes vibrations that are transmitted from the engine to the structure to which it is mounted.

Other machines, such as free piston Stirling cycle engines, also create vibrations as they convert thermal energy to mechanical energy. Free piston Stirling cycle engines have a working gas that is moved between a warmer space and a cooler space by a reciprocating displacer to drive a reciprocating piston.

It is conventionally known that it is desirable to reduce vibrations caused by free piston Stirling cycle machines, such as engines. An apparatus for accomplishing this purpose is described in U.S. Pat. No. 5,895,033 to Ross et al., which is incorporated herein by reference.

Ross et al. describe an apparatus that is mounted to the housing of a free piston Stirling cycle machine. The apparatus includes a combined spring and mass. The spring/mass combination is tuned to a natural frequency that causes it to reciprocate in a phase relationship with the free piston and displacer of the machine, to reduce significantly the reciprocation of the housing. For example, the mass generally moves in opposition to the combined inertia of the internal moving parts of the machine. Thus, the result of the Ross et al. invention is a reduction of the vibration transmitted from the housing of the machine to the surrounding structures.

One difference between a free piston Stirling cycle machine and a conventional internal combustion engine is that the piston of the conventional engine described above has a predetermined amplitude of oscillation that cannot be exceeded unless a part of the engine such as the crank shaft, breaks. On the contrary, the piston in a free piston Stirling cycle machine is not so structurally limited in the distance which it normally travels in its path of reciprocation. Under normal conditions, a free piston will reciprocate within a predetermined amplitude range. However, the amplitude can exceed this range under some circumstances, thereby resulting in what is commonly known as "overstroke". Overstroke is the condition in which the piston exceeds a predetermined amplitude range. If overstroke cannot be stopped before it becomes excessive, harm can come to the engine.

Although dynamic vibration absorbers, such as described by Ross et al., help to reduce the vibration transmitted to the surrounding structures, there is also a need to prevent or stop overstroke in free piston machines.

BRIEF SUMMARY OF THE INVENTION

The amplitude of oscillation of the massive body in conventional dynamic vibration absorbers is related to the amplitude of oscillation of the free piston. The invention is an apparatus for detecting and halting excessive amplitude of oscillation of a free piston slidably mounted in a housing by detecting the amplitude of oscillation of the massive body of the dynamic absorber. A vibration-absorbing body is mounted through a spring to the housing for reciprocating the body relative to the housing along a path in a phase relationship to the piston. The invention includes a sensor mounted near the body for detecting the amplitude of oscillation of the body. A controller is connected to the sensor for reducing the amplitude of oscillation of the piston when the amplitude of oscillation of the body reaches a predetermined maximum.

In a preferred embodiment, the sensor is mounted in the path of the body and is contacted by the body if the body oscillates beyond a predetermined maximum. The controller in the preferred embodiment comprises a computer that is connected to a fuel valve actuator or, alternatively, an electrical load or some other means for reducing piston amplitude. Upon detecting a signal from the sensor indicating that the body is oscillating at an amplitude that exceeds its predetermined maximum, the computer signals the actuator to decrease the fuel supplied to the free piston machine. In this preferred embodiment, the free piston machine is a free piston Stirling cycle engine heated with a gas flame, and the fuel valve is actuated to reduce the amount of fuel delivered to the flame, thereby reducing the amount of thermal energy imparted to the Stirling cycle engine, which decreases the amplitude of oscillation of the piston.

Figure 1:
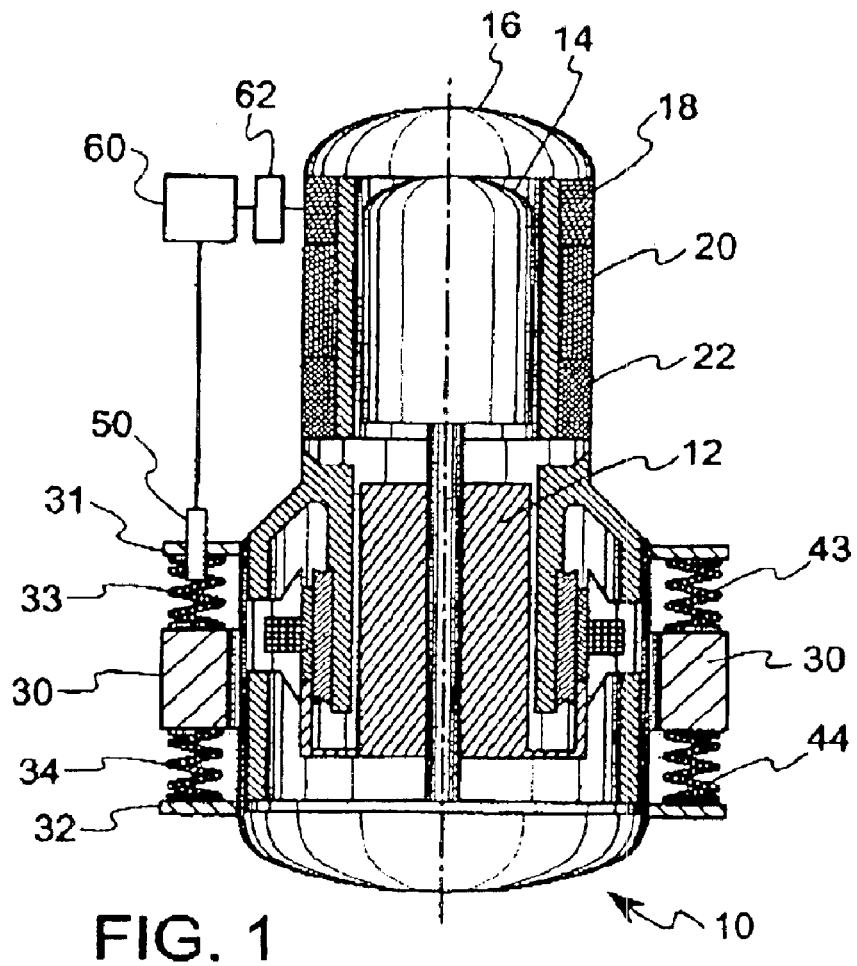
FIG. 1 is a schematic side view in section illustrating the present invention on a conventional free piston Stirling cycle engine.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

The preferred embodiment of the present invention is shown in FIG. 1. The conventional Stirling cycle engine 10 has a piston 12 and a displacer 14 in a housing 16. The piston 12 is driven in a conventional manner by the heater 18 heating gas within the housing 16 and displacing the displacer 14 to drive the gas through the regenerator 20 to a cooler 22. The net result of the thermodynamic cycle is to drive the piston 12 in oscillating movement. In the example of the engine 10 of FIG. 1, the engine produces electricity. The heater 18 can be, for example, a component, such as a heat exchanger, of a gas burning heater, such as the type that uses a natural gas fueled flame.

In order to reduce the vibrations transmitted to the structures surrounding the engine 10, the massive body 30 is mounted to the housing 16. The body 30 is preferably an annular weight. The housing 16 has a pair of plates 31 and 32 that extend radially from the housing 16 around the entire circumference thereof to form a gap between the plates 31 and 32. The body 30 is suspended between the plates 31 and 32 by attachment to the ends of the springs 33, 34, 43 and 44.

The body 30 and attached springs form a vibration absorber that is tuned to the natural frequency of the engine 10 to reduce or eliminate the vibration of the housing 16 in a conventional manner. During operation, the body 30 oscillates in a phase relationship with the piston 12, and with an amplitude that is a function of the amplitude of the piston 12. Thus, the body 30 has a normal amplitude of oscillation in a path that extends between the plates 31 and 32.

A sensor 50 is mounted to the plate 31 in the path of the body 30, but just outside the longitudinal end of the normal range of reciprocation. The sensor 50 can be a pressure-sensitive switch that is actuated by contacting the lower end thereof in the orientation shown in FIG. 1. Thus, if the body 30 exceeds its normal amplitude of oscillation, it will begin to go beyond the longitudinal end of its normal range of reciprocation and strike the lower end of the sensor 50.

The sensor 50 is preferably connected to a controller, such as the computer 60, which is connected in a preferred embodiment, to a valve 62 that controls the amount of fuel that is supplied to the heater 18. Therefore, when the sensor 50 detects that the amplitude of oscillation of the body 30 has exceeded a set maximum, such as by the body 30 striking the sensor 50, the sensor 50 signals the computer 60 of the condition, and the computer 60 reduces the amount of heat the heater 18 supplies to the engine 10, such as by reducing the amount of fuel that can flow through the fuel valve 62.

The sensor 50 can be a pressure sensitive switch, as described above, that is placed in the path of the body 30 and just out of the normal range of reciprocation. Of course, the sensor can alternatively be any device that detects the position of an oscillating body, and can produce a signal when that body exceeds a predetermined boundary. Furthermore, the sensor need not be positioned in the path of the body if the sensor can detect the body's position when spaced from the body.

Likewise, the controller can be a computer, or any alternative device that can receive a signal from the sensor and reduce the oscillation of amplitude of the piston. For example, the controller can be a logic circuit that receives signals from the sensor, and actuates the gas valve 62 when the condition exists that the oscillating body has exceeded its boundaries.

The mechanisms by which the piston's amplitude can be reduced are virtually innumerable. In the preferred embodiment, the mechanism by which heat is applied to the engine is reduced in the normal manner by which the heat is controlled. However, it is also possible to reduce the piston's amplitude by varying gas porting or by applying a load to the machine, such as a resistor in an electricity-generating engine. Other mechanisms will become apparent to the person of ordinary skill.

Figure 2:
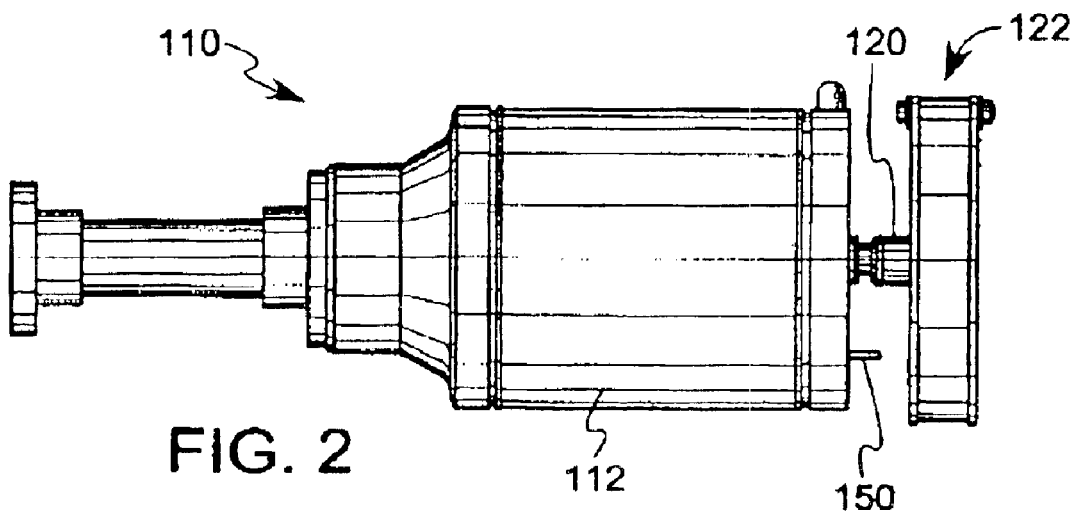
FIG. 2 is a side view illustrating an alternative embodiment of the present invention.
Figure 3:
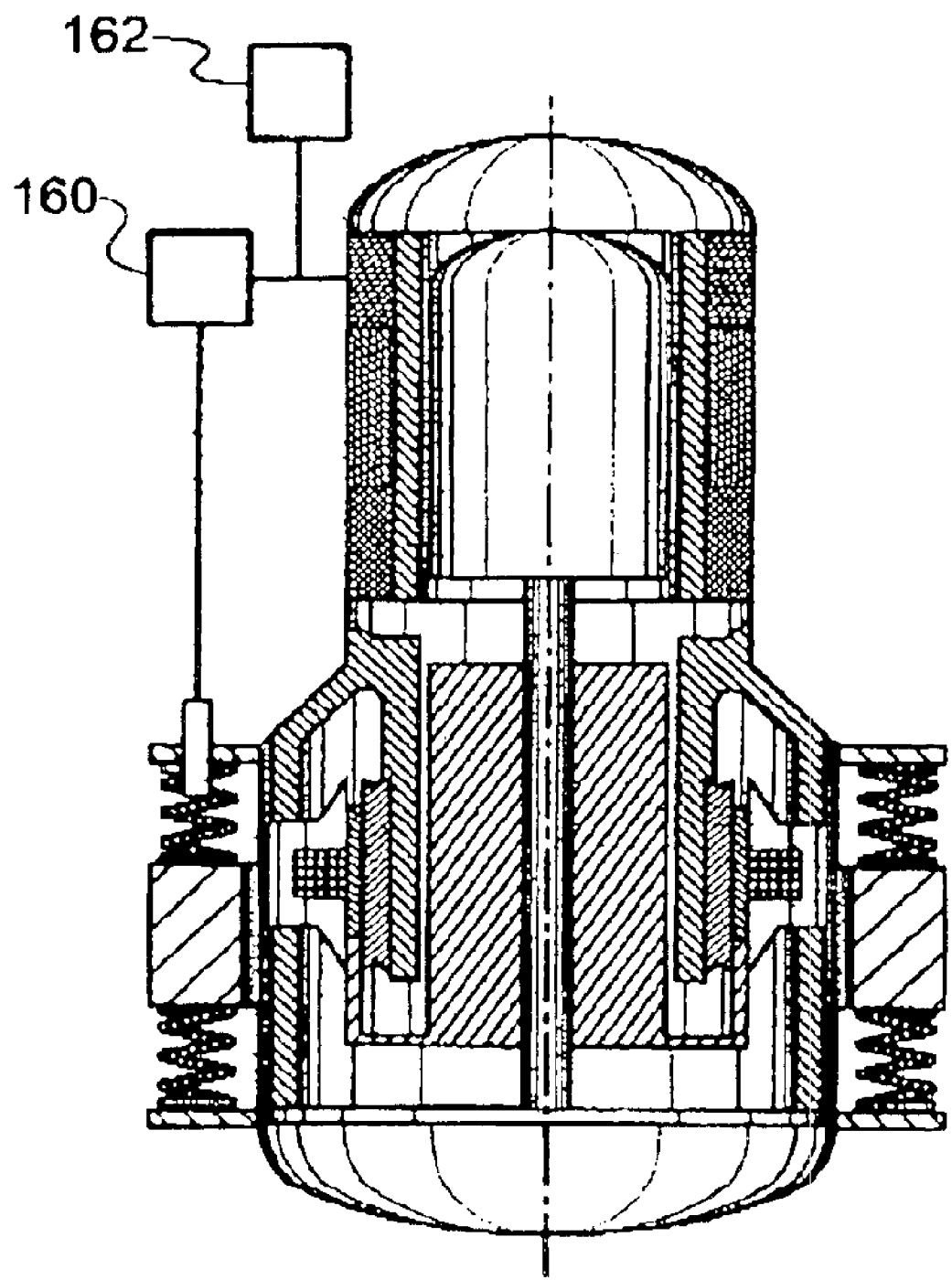
FIG. 3 is a schematic side view in section illustrating the present invention on a conventional free piston, Stirling cycle engine that includes a controller 160 and an electrical load 162.

In an alternative embodiment shown in FIG. 2, the free piston Stirling cycle machine 110 has a housing 112 to which a rod 120 is rigidly mounted. A pair of planar springs sandwich an annular mass to form the vibration absorber 122. The vibration absorber 122 functions in essentially the same manner as the vibration absorber of the engine 10 shown in FIG. 1.

The machine 110 has a sensor 150 mounted to the housing 112 at one side of the vibration absorber 122. The sensor 150 can be an optical or other sensor that detects whether a part of the vibration absorber 122 has exceeded a predetermined maximum amplitude of oscillation. If the sensor 150 detects that the vibration absorber has exceeded its maximum amplitude, the sensor signals a connected controller (not shown) regarding the condition. The controller subsequently reduces the amplitude of oscillation of the piston (not shown) to prevent or mitigate any overstroke.

While certain preferred embodiments of the present invention have been disclosed in detail, it is to be understood that various modifications may be adopted without departing from the spirit of the invention or scope of the following claims.

What is claimed is:

1. An apparatus for detecting and reducing excessive amplitude of oscillation of a free piston slidably mounted in a housing, the housing having a vibration-absorbing body mounted to a spring that is drivingly linked to the housing for reciprocating the body relative to the housing along a path that is not perpendicular to a path of the piston and in a vibration-absorbing phase relationship to the piston, the apparatus comprising:

a) a sensor mounted near the body for detecting an amplitude of oscillation of the body; and
   b) a controller connected to the sensor for reducing the amplitude of oscillation of the piston when the amplitude of oscillation of the body reaches a predetermined maximum.

2. The apparatus in accordance with claim 1, wherein the sensor is mounted within the path of the body for being contacted by the body upon oscillation of the body beyond a predetermined maximum.

3. The apparatus in accordance with claim 2, wherein the controller further comprises a computer that is connected to a fuel valve actuator.

4. The apparatus in accordance with claim 2, wherein the controller further comprises a computer that is connected to an electrical load.

5. The apparatus in accordance with claim 3, wherein the piston and housing are part of a free piston Stirling cycle machine.

6. The apparatus in accordance with claim 2, wherein the controller further comprises a computer that is connected to a gas port actuator.

7. The apparatus in accordance with claim 1, wherein the controller further comprises a computer that is connected to the sensor, and wherein the sensor detects the amplitude of oscillation of the body and transmits to the computer data relating to said amplitude of oscillation of the body.

8. The apparatus in accordance with claim 7, wherein the controller further comprises a fuel valve actuator.

9. The apparatus in accordance with claim 7, wherein the controller further comprises an electrical load.

10. The apparatus in accordance with claim 8, wherein the piston and housing are part of a free piston Stirling cycle machine.

11. The apparatus in accordance with claim 7, wherein the controller further comprises a gas port actuator.

12. An apparatus for detecting and reducing excessive amplitude of oscillation of a free piston slidably mounted in a housing, the housing having a vibration-absorbing body mounted to a spring that is drivingly linked to the housing for reciprocating the body relative to the housing along a path that is not perpendicular to a path of the piston and in a vibration-absorbing phase relationship to the piston, the apparatus comprising:

a) a sensor mounted within a detection range of the body, for detecting an amplitude of oscillation of the body; and b) means connected to the sensor for reducing the amplitude of the piston when the oscillation of the body reaches a predetermined maximum.

13. The apparatus in accordance with claim 12, wherein the sensor is mounted within the path of the body for being contacted by the body upon oscillation of the body beyond a predetermined maximum.

14. The apparatus in accordance with claim 13, wherein the piston and housing are part of a free piston Stirling cycle machine.

* * * * *